No. 726,620. PATENTED APR. 28, 1903.
H. BERG.
STEAM VALVE.
APPLICATION FILED NOV. 12, 1901.
NO MODEL.

Witnesses:
C. W. Benjamin
L. G. Hensley

Inventor:
Hans Berg,
by Joseph L. Levy
Asso. atty his subject of the Emperor of Russia, residing at Riga, in the Empire of Russia, have invented certain new and useful Improvements in Steam-Valves, of which the following is a specification.

The usual cast-iron steam-pipes which are universally employed at the present day and which are worked under greater and less high internal pressures are, notwithstanding the most rigorous precautions, always liable to the danger of bursting during use. A slight bending of the pipe caused by the weight thereof or a weak spot in the wall of a part of the pipe caused by internal rust will frequently lead to an unexpected bursting of the pipe and a dangerous explosion. The direct effect of the explosion itself is less to be feared than the fact that even persons at a distance, especially in confined spaces, may be severely scalded by the sudden escape of volumes of steam when the pipe bursts, as well as by the flying boiling water, or they may be choked outright. Now the subject-matter of the present application is a balanced steam-valve for pipe breakages which may be manipulated on steam-pipes in use in precisely the same manner as an ordinary steam-stop valve and by suitable adjustment is always ready when in its open position to automatically and effectually shut off the whole of the steam-pipe from the boiler in case an unforeseen burst takes place. This valve is a so-called "balanced" valve—that is to say, before it is actually opened it equalizes the pressure between the previously-closed steam-pipe and the boiler, and thereby materially facilitates the movement of the spindle.

Figures 1, 2:
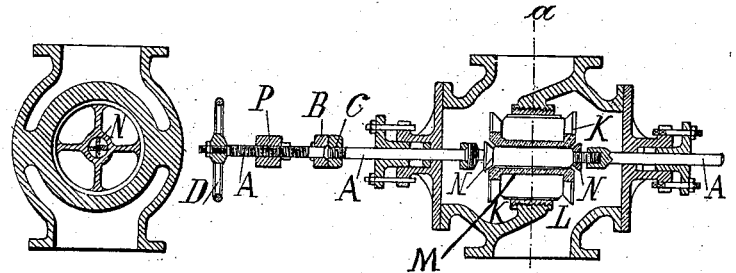
Figures 3, 4:
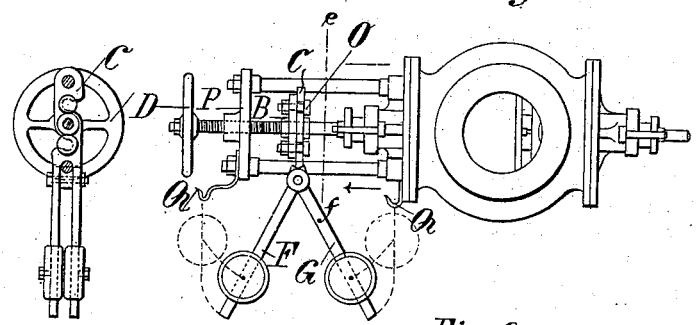

In the accompanying drawings, which illustrate the invention in two constructions, Figure 1 is a longitudinal section through a so-called "double-seated" valve, and Fig. 2 a section on the line $a\,b$ of Fig. 1. Fig. 3 is an elevation of the valve; Fig. 4, a section on the line $e\,f$ of Fig. 3 looking in the direction of the arrows, and Figs. 5 and 6 are respectively a longitudinal section and a side elevation of a second construction of the invention in the form of a single-seated valve.

The valve itself, Fig. 1, is formed of a double-seated valve-casing, which fits with its two faces K K upon the corresponding seats L of the two-part sleeve, which is screwed into the valve-casing for this purpose. This valve according to circumstances shuts off the pipe by either one seat or the other. The spindle is not screwed directly to the valve-body, but is provided on both sides thereof with small supplemental conical valve-bodies N, which are ground into and fit corresponding seats in the valve-body K. The movement of the main valve is so arranged that in each closed position of the valve M and before it is moved the corresponding supplemental valve-body M N is moved first, and the pipe thereby always first filled with steam through the valve-body M, so that the pressure upon both faces of the corresponding valve-body M is equalized and the opening of the valve by hand thus rendered much easier. The valve-bodies M are now coupled to the portion of the valve-spindle A which is provided with a correspondingly-formed cross-head C and is sufficiently accurately guided in its stuffing-box. This cross-head, which is itself guided on the usual pillars of the valve-cover, is connected to a second piece B by means of corresponding screws O. The screw-spindle proper, A, of the valve is mounted to turn in this piece B by means of a cone, so that when the spindle is rotated the piece B moves to and fro with it.

The manipulation of this valve for pipe breakages is as follows: Supposing the valve to be closed, in which case one of the two faces K would be pressed upon its corresponding seat, then the pieces C and B being connected by turning the hand-wheel D either of the valves N and then the valve in question will be opened. This valve will be lifted to such an extent only to allow the piece C to assume the middle position, (shown in Fig. 3,) in which the valve shows sufficient open cross-sectional area. In this position the piece C is jammed between the jaws of two loaded levers F and G, suitably mounted on a guide-post on the valve-cover, so that no displacement thereof can take place under the pressure of the steam passing through during ordinary working. It is clear that for this purpose the levers and the weights need merely be suitably proportioned. When the valve is adjusted, the screws O are loosened and removed, the parts A and A' of the valve-spindle disconnected from each other, and the latter shifted by turning the hand-wheel till the piece B bears directly against the boss P, the cross-head C being locked by the loaded levers and the admission of steam thereby insured. If now a serious breakage in the pipe takes place which will cause a violent outrush of a large volume of steam as well as a violent shock in the steam-column, the influence of the stop-levers F and G will be overcome and simultaneously with the lifting of one or other of them the cross-head C will be so moved that the valve will be closed either one way or the other and the pipe thereby shut off. This movement of the cross-head C can of course take place both ways after the piece B is removed.

Figures 5, 6:
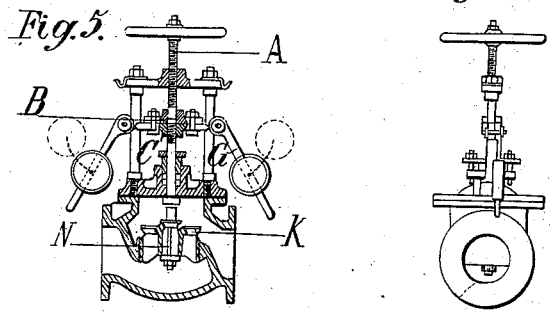

In Figs. 5 and 6 is shown a second construction of valve in which the valve-spindle may be mounted vertically. The mode of operation of this single-seated valve is similar to that of the double-seated valve above described, only in the second construction the piece B need not be thrust back, because the valve is only to be closed in one direction. Further, in addition hooks Q may be mounted on the valve-casing bearing the weights of the safety-levers F and G hung thereon, so that if desired these levers may be completely put out of action.

A further modification of the construction of both the above-described forms of valve may be made by loading the levers F and G by means of springs (acting either by tension or compression) instead of by weights, said springs allowing of ready adjustment. This form of construction will be found particularly suitable in places where the valves used on steam-pipes are subjected to vibration and severe shocks—as, for example, on board ship, where the weighted levers might easily become deranged and the adjustment of the valves upset.

What I claim, and desire to secure by Letters Patent of the United States, is—

1. In a valve, the combination with the casing, of the valve-seats, a valve-body having faces K on both ends thereof, a spindle to operate said valve-body, the cross-piece C attached to said spindle, and weighted levers adapted to coöperate therewith, normally holding the valve in an open position.

2. In a valve, the combination with the casing, the double-seated valve-body, relief-valves within said valve-body, a spindle therethrough, weighted levers to hold the valve-body open by means of the cross-piece C, a threaded rod mounted in the framework and adapted to engage the spindle to turn the same, and means for disengaging the said rod from the spindle.

3. In a valve, the combination with a casing, of a valve-body having faces K on both ends thereof, a supplemental valve-body contained within the first-named valve-body, also having valve-faces on each end thereof, and means for seating both the main and primary valve-faces.

4. In a valve, the combination with a casing, a valve-body within the same having faces K, the primary valve-body and faces thereon, the latter being within the said first valve-body, a spindle connected with the primary valve-body, the cross-piece C, weighted levers connected therewith, and means whereby when one of the valves becomes abnormal, the primary valve disengages said levers, and the valve-seats are closed.

In testimony whereof I have hereunto set my hand in the presence of two witnesses.

HANS BERG.

Witnesses:
ARTHUR BUTTS,
SÖREN HANSEN.